Oct. 29, 1963  J. A. GLASSMAN  3,108,594
SURGICAL EXTRACTOR AND METHOD OF USE
Filed Aug. 14, 1962  3 Sheets-Sheet 1
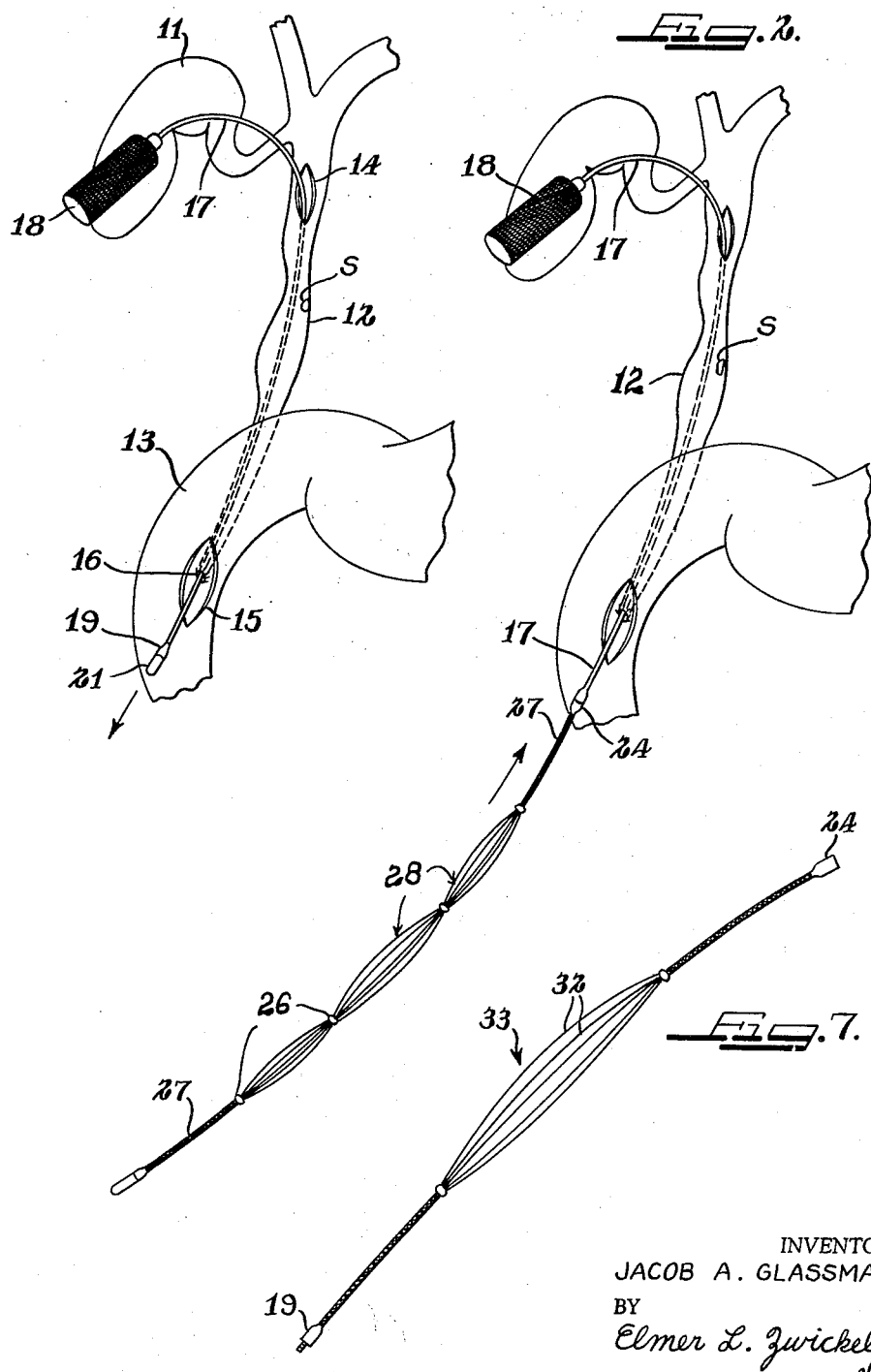
INVENTOR.
JACOB A. GLASSMAN
BY
Elmer L. Zwickel
Atty.

Oct. 29, 1963  J. A. GLASSMAN  3,108,594
SURGICAL EXTRACTOR AND METHOD OF USE
Filed Aug. 14, 1962  3 Sheets-Sheet 2
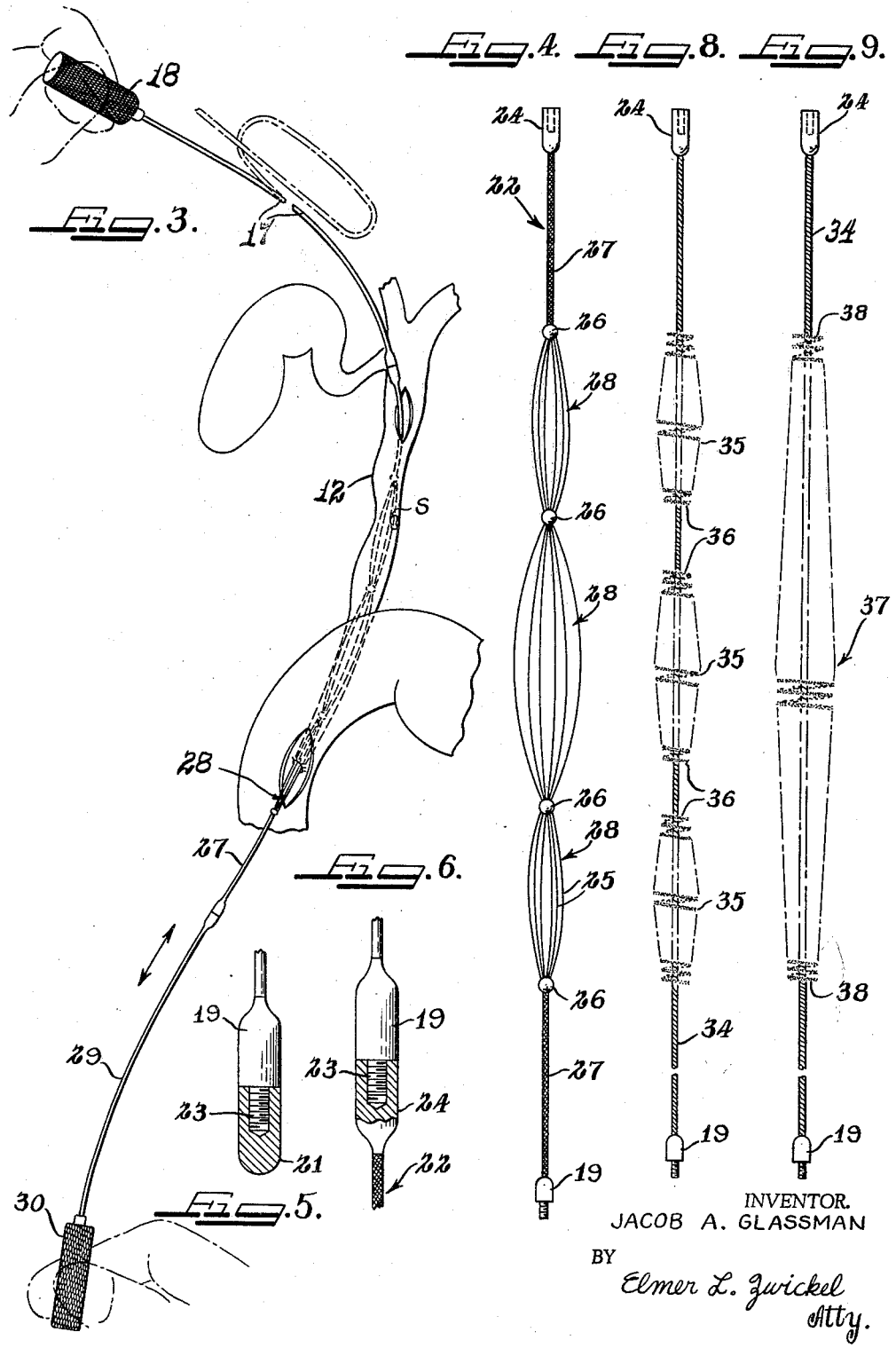
INVENTOR.
JACOB A. GLASSMAN
BY
Elmer L. Zwickel
Atty.

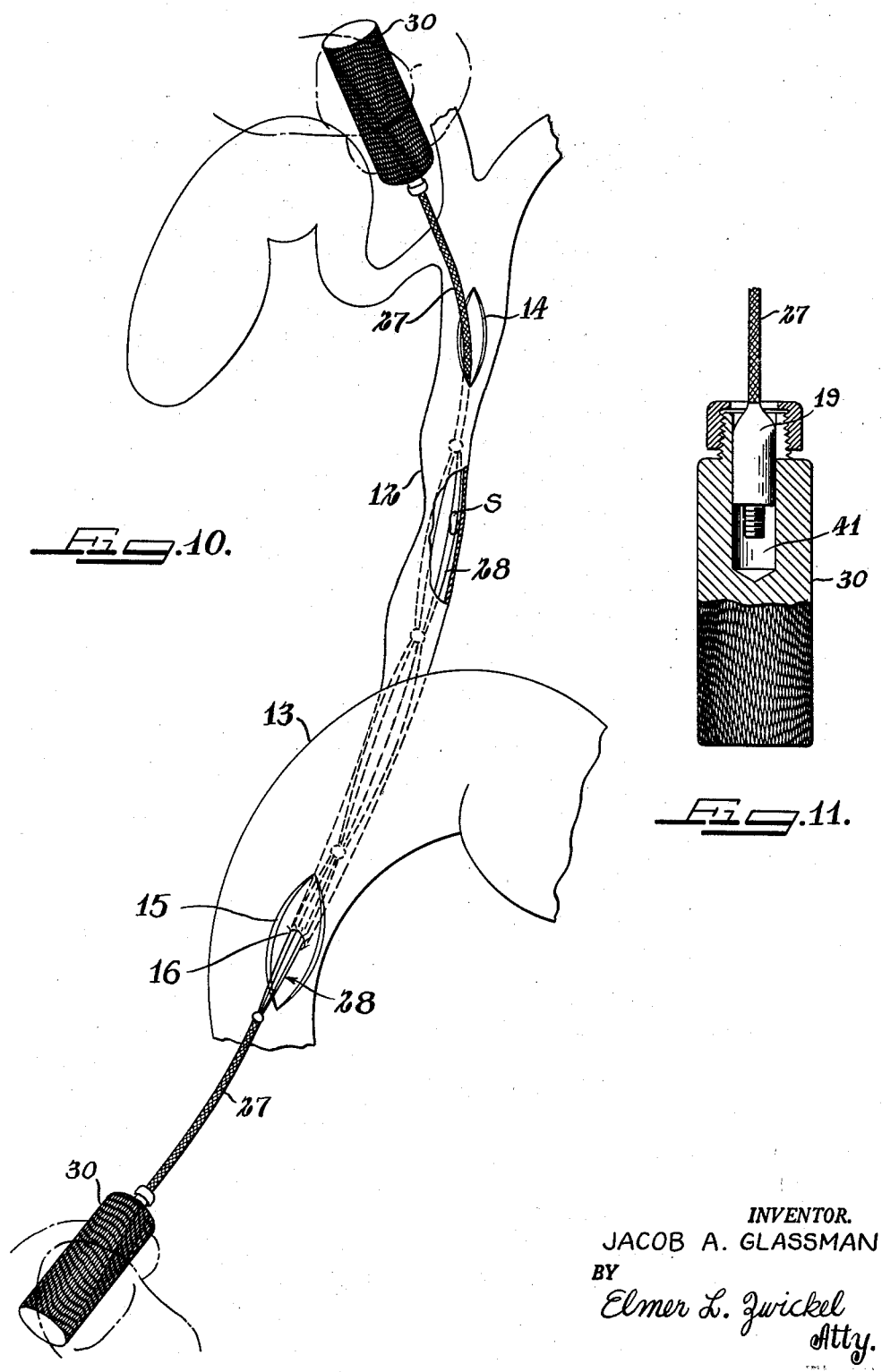

United States Patent Office 3,108,594
Patented Oct. 29, 1963

3,108,594
SURGICAL EXTRACTOR AND METHOD OF USE
Jacob A. Glassman, 1680 Meridian Ave.,
Miami Beach, Fla.
Filed Aug. 14, 1962, Ser. No. 216,920
9 Claims. (Cl. 128—328)

This application is a continuation-in-part of my application Serial No. 95,220, filed March 13, 1961.

The invention relates to improvements in surgical instruments and their method of use and is more particularly concerned with the novel construction of an instrument for use in the extraction of dislodged gall stones from the common bile duct irrespective of their size or degree of impactness.

More particularly, the novel instrument herein disclosed in several structural embodiments is of a character that is adapted to be drawn through, rotated, and/or reciprocated to and fro longitudinally in the common bile duct while tensioned so as to engage with, dislodge and/or entrap a gall stone or stones for withdrawal from said duct. The employment of this type of instrument involves the novel practice of making a high level incised opening into the common bile duct and an incised opening into the duodenum in an area opposite to the termination of said duct in the duodenum for the entrance and exit of the instrument.

In the use of the instrument, a flexible shape restraining probe having a removable blunt male tip at the lead end, and a female socket at the other end is inserted through the high level incised opening and fed into the common bile duct, and as it emerges through the sphincter of Oddi it is projected out through the incised opening in the duodenum (duodenostomy). The blunt male tip of the probe is removed and a novel instrument, or a connected series of integrated instruments, is connected thereto and each is then drawn upwardly into and through the common bile duct while being tensioned, twisted and/or turned at both ends. Each instrument may be rotated or reciprocated to and fro during its upward or downward passage through the duct. The construction of the instrument is such that when the instrument is tensioned and moved by short to and fro motions through the duct, and in some instances rotated, a multiplicity of novel stone engaging and entrapping sections or cages therein entrap a stone or stones in such manner as to dislodge it from the bile duct lumen or wall and entrap it snugly within one of the sections or cages. When the instrument is withdrawn from the duct through either the high level or low level incised opening, the entrapped stone is withdrawn with it.

Prior known types of instruments employed in bile duct stone removal are essentially curved forceps, probes or spoons that are inserted through an incised opening at the upper level of the common bile duct and either slide by or are necessarily forced past the stone or stones and are too often withdrawn back again through the same incised opening without successfully extracting the stone or stones. Such procedures are very tedious and prolonged, and are frought with a high morbidity and are time consuming and very often unsuccessful.

The herein disclosed instruments are distinguishable from prior known instruments used for bile duct stone removal primarily in the fact that they each include a multiplicity of non-movable, yet deformable, stone dislodging and/or entrapping elements and present a structure that affords simple manually controlled means to increase and decrease the size of the stone dislodging and entrapping elements thereof to facilitate stone dislodgment and insure entrapment of multi-sized and faceted gall stones, whereas in prior instruments no means is provided for such predictable control. Also, prior known instruments heretofore used to remove kidney stones, are too large, tramatic in character and have only a single means for engaging the stones that are too often hampered by a central wire or control rod at one end of the instrument which reduces the efficiency and capacity of the instrument. Such single basket type used for engaging kidney stones in the ureter are used blindly. In use, it is impossible to exercise any control over the lead end, the only unpredictable control being at the manipulating end outside of the body and extending out of the urethra. The entire procedure is blind.

It is therefore an object of the invention to provide a novel method for removal of stones from a common bile duct.

Another object is to provide novel instruments of the character referred to.

Another object is to provide a stone extraction instrument with novel structural features adapting it to be tensioned while being drawn upwardly or downwardly through a common bile duct in a continuous direction or while being moved to and fro and/or progressively rotatably oscillated.

Another object is to provide a stone extractor with no movable parts of a character having a multiplicity of highly flexible cages or bobbins or other stone dislodging sections of like or different sizes spaced along its length and which are capable of being expanded or contracted without distortion at will so as to adopt the sections to the particular diameter or varying diameters of the common bile duct and to entrap a dislodged stone or stones and effect its withdrawal from the duct in an upward or downward direction.

Another object is to provide an instrument of the character referred to which may be manipulated manually at both of its ends.

With the foregoing and such other objects and advantages in view, which will appear as the description proceeds, the invention pertains to a novel method of stone removal and to an instrument embodying novel features of construction, anrrangement and combination of parts hereinafter fully described, illustrated in the accompanying drawings, and particularly pointed out in the appended claims, it being understood that various changes in form, proportion, size and minor details of the structure may be made, without departing from the spirit of the invention.

Referring to the drawings in which the same characters of reference are employed to identify corresponding parts in the several embodiments illustrated:

FIG. 1 is a schematic representation of the common bile duct and associated organs, illustrating initial placement of the flexible probe, bearing male and female fittings at each end.

FIG. 2 is a view similar to FIG. 1, showing one embodiment of the novel instrument attached to the probe.

FIG. 3 is a view similar to FIGS. 1 and 2, showing the instrument partially drawn upwardly into the common bile duct and illustrating the manipulation thereof.

FIG. 4 is an enlarged detail view of the instrument shown in FIGS. 2 and 3.

FIG. 5 is an enlarged sectional detail view of the lead end of the probe, showing a blunt tip attached thereto and in section.

FIG. 6 is an enlarged detail view, partly in section, of the connection between the instrument and the probe.

FIG. 7 is a view illustrating a single cage type of instrument, embodying features of the invention.

FIG. 8 is a view illustrating a modified form of stone dislodging and removing instrument.

FIG. 9 is a view illustrating a modified form of stone dislodging instrument.

FIG. 10 is a diagrammatic view illustrating a use of the multiple cage instrument shown in FIG. 4.

FIG. 11 is an enlarged detail view, partly in section, showing a handle attached to one end of the instrument.

Referring generally to the exemplary disclosures in the accompanying drawings, the improved instruments are so designed that they may be inserted through an incision in the duodenum at the level of the sphincter, then through the sphincter of Oddi and common bile duct and then finally withdrawn preferably out through a high level incised opening in the common bile duct (choledochotomy).

Ideal manipulation of the instrument is accomplished by initial insertion, through the high level incised opening of a fine flexible shape-retaining probe having a blunt tip removably attached to its lead end, that is easily lead downwardly through the common bile duct and the sphincter of Oddi for emergence into the duodenum where it can be viewed through the duodenostomy stoma. The probe preferably is fabricated from a thin relatively firm but pliable length of silver, copper or other pliable metal bar stock. Upon emerging, the blunt tip on the probe is removed and said probe is then attached, by being threaded, clamped, snapped, sutured, or otherwise secured, to one end of another component of the novel instrument unit. The probe is then withdrawn upwardly to carry the instrument component through the sphincter of Oddi and into the common bile duct. A trailing lead may be connected to the other end of the instrument component for purposes of manipulation.

As previously noted hereinabove, the instrument embodies novel means to dislodge and entrap an impacted stone or stones and is highly flexible and pliable so as to accommodate itself to the sphincter of Oddi and to the variable diameters of the bile duct. When the instrument is located in the duct, it is drawn upwardly through and/or reciprocated or rotated in the duct while applying variable resistance to the trailing end, as by holding same, handles being provided for this purpose. The longitudinal pull exerted simultaneously in both directions on both ends of the instrument and which may be varied during use of the instrument, results in dislodging any impacted stone or stones and the entrapping of such stone or stones in the flexible sections or cages. The stone enters into the confines of a related cage and is entrapped therein whereupon it is removed with the withdrawal of the instrument from the duct either through the opening in the common duct or through the sphincter of Oddi. In some instances it may be necessary or advisable to move the instrument in short to and fro circular and longitudinal motions to engage and/or dislodge the stone and to then withdraw the instrument and entrapped stone from the duct either upwardly or downwardly. Manipulation of the instrument may be facilitated by the presence of long flexible shafts or extensions at both ends, but this is not usually necessary.

The stone dislodging and removing instrument is disclosed herein in several embodiments, each characterized by its ability to be stretched at both ends in a longitudinal direction so as to extend or constrict the stone engaging and entrapping sections thereof and facilitate initial passage through the sphincter of Oddi, close tolerance with the irregular wall of the common bile duct, and final and total dislodgment and entrapment of the obstacle to be removed. In another embodiment disclosed, the instrument is intended primarily for stone dislodgment although it will function to carry a stone out of the duct.

Referring now particularly to the exemplary disclosure specifically illustrated in FIGS. 1 through 3, there is shown rather diagrammatically, the anatomy of a gall bladder 11 and common bile ducts 12 which opens into the duodenum 13. In the herein disclosed method of and means for stone removal, an incised opening 14 is made at a high level in the common bile duct and a second incised opening 15 is made in the duodenum (duodenostomy) opposite to the site of the sphincter of Oddi 16. A fine double blunt tipped probe, having male and female screw-on ends, comprised of a length of fine soft deformable shape-retaining wire or probe 17 is provided for insertion through the high level common bile duct incised opening 14 a distance sufficient to carry its lead end out through a sphincter of Oddi and into the lower incised opening in the duodenostomy stoma. The probe preferably has a screw-on or otherwise attached removable handle 18 at one end and is formed at its other or leading end with an element 19 carrying a blunt tip 21 (FIG. 5) which is subsequently removed and a stone dislodging and removing instrument such as that shown at 22 (FIG. 4) is attached. In lieu of the handle 18, the probe 17 may be coiled in part as shown in dotted lines in FIG. 3, to form a handle portion. The probe element 19 may include a threaded stem 23 onto which the blunt tip 21 is initially threaded and onto which a female element 24 on one end of instrument 22 is subsequently threaded, all as best shown in FIGS. 5 and 6. Obviously, the probe 17 may include other suitable means on its ends permitting it to be sutured, snapped, clamped, or otherwise attached firmly to a handle and to the instrument. It is important that elements 19 and 24 gradually diminish in size to merge with the respective elements on which they are carried so as to eliminate any abrupt shoulder which might interfere with easy passage of the parts through the sphincter of Oddi.

The instrument shown in FIGS. 2 and 3, and best shown in FIG. 4, is comprised of a bundle of fine spring wire strands 25 (preferably 5) that are coextensive with each other and are secured together firmly at spaced intervals along their length, as at 26. These firm connections 26 may be attained by any suitable construction such as for example by means of the clamp beads shown or by swedging, soldering, welding, etc. The separate strands 25 are each bowed normally outwardly radially between connectors 26 to provide a series of cages 28 that are subject to longitudinal elongation and circumferential contraction medially when a pulling force is exerted longitudinally at opposite ends thereof. In the three cage unit illustrated, the middle cage preferably is of greater length and diameter than the two outer or end cages. Obviously, more or less such cages of like or different dimensions can be provided. Preferably the strands between the outer clamp beads 26 and the ends may be braided as shown at 27.

Now, with the instrument 22 attached to probe 17, as aforesaid, the probe is withdrawn slowly and carefully so as to draw the instrument up through the sphincter of Oddi and into the common bile duct 12. Passage of the instrument through the sphincter of Oddi is accomplished without trauma owing to the soft flexibility and deformability of cages 28 which may be completely collapsed by applying the requisite outward resistance to both ends of the assembly. Otherwise stated, the operator may grasp handle 18 while retaining a secure hold on the trailing end of the instrument which, as illustrated in FIG. 3, may, if desired, be provided with a trailing lead 29. In either event, a handle 30 may be attached to facilitate manipulation.

When so held and stretched, the instrument may be drawn upwardly through the duct in a straight forward direction and/or by applying a to and fro motion with intermediate increased and decreased tension. During such movement the strand cages 28 adjust themselves to the varying diameters of the duct simply by increasing or decreasing the tension or tautness on the ends of the instrument; and if desired, the instrument may be rotated in one direction or oscillatably rotated to and fro while being advanced through the duct or while being held stationary insofar as advance movement is concerned. Such total manual control of a one-piece instrument assembly without movable parts, causes the strands defining the cages to more effectively engage and dislodge an impacted stone "S" tangentially with the result that the stone will be carried into the interior of a cage and be entrapped therein and then removed when the instrument is finally withdrawn from the upper or lower incised opening.

Clearly, the high degree of flexibility and resiliency of the instrument without any movable parts and the presence of a plurality of cages therealong which maintain their fixed identity irrespective of the amount of end-tension applied thereto, adapts it to easy harmless passage through the sphincer of Oddi and common bile duct, dilating same if necessary, and insures adequate firm, non-injurious engagement with and dislodgement of an obstacle in the duct, irrespective of its degree of impactness, and its entrappment in one of the multiplicity of cages provided, all during a single pass through the duct. The presence of cages of different sizes along the length of the instrument materially increases the chances of successful removal of a stone or stones of the same or variable size, in one passage through the duct thus making it improbable that several separate attempts must be made to dislodge and remove the stone.

FIG. 7 illustrates a unit instrument with only a single cage comprised of long wire strands 32 normally bowed to provide a single elongated cage 33 and provided at each of its braided end extensions 27 with fittings 19 or 24, for attachment to any accessory instrument units, as shown in FIG. 2. This structure, having no movable parts other than the flexible strands defining the cage is capable, when being stretched longitudinally by forces applied outwardly at both ends simultaneously, of having a minimal cross-sectional area and, when the stretching pressure is relieved, the strands 32 relax outwardly radially into their normal fixed bowed condition and into contact with the duct wall. Thus, upon manipulation, as aforesaid, the strands of the cage are effective to engage, dislodge and entrap within the cage any stone or stones encountered upon being drawn through the duct in a straight or twisting upwardly direction.

The FIG. 8 disclosure illustrates a unit-instrument particularly intended for use to dislodge a firmly impacted or attached stone. In this embodiment, a single or multi-strand flexible body or stem 34 is provided. This may comprise silver or fine steel wire strands or plastic filaments. In either event, a multitude of groups 35 of bristles or plastic material such as "nylon" are adhered to body 34 by being twisted into the flexible strands thereof. In the present disclosure there is shown three such groupings wherein the medial group is slightly larger in diameter and length than the end groups and each group is of larger diameter medially of its length. The groups 35 are spaced apart as shown and each group has abrupt terminal ends so as to afford a shoulder or ledge 36 intended to support a dislodged stone and effect its removal when the instrument is withdrawn.

One or both ends of the body 34 carries an attachment element 19 on which a blunt tip may be mounted or for securement of a probe 17 and/or a trailing end 29 of the character shown in the FIG. 2 disclosure. When this instrument is drawn into and through the sphincter of Oddi, the bristles in each group 35 flex sufficiently to facilitate their entrance without damage and when within the duct, said groups of bristles return to their normal extended positions so as to provide a multitude of means that act on and dislodge a stone when the instrument is drawn through, rotated in or moved to and fro longitudinally of the duct.

In the FIG. 9 disclosure there is illustrated a structure responding to the FIG. 8 disclosure except that here there is a single bristle unit 37 having abrupt ends 38 and an enlarged medial diameter. In other respects it responds to the FIG. 8 disclosure and like numerals identify corresponding parts.

Referring now to FIG. 10 disclosure wherein like numerals are used to identify corresponding parts, the cage type instrument of FIG. 4 is shown in a position of use extended through duct 12. In this use, the probe is removed and a handle 30 is attached directly onto the end fittings 19 and 24 of the instrument so that the instrument may be maniplated by the application of tension on its ends effective to cause contraction and expansion of cages 28 during stone removal. The instruments shown in FIGS. 7, 8 and 9 may be used in a like manner.

Although any suitable handle structure may be employed it is preferred that the handle be constructed substantially as shown in FIG. 11. As illustrated, the handle has an end bore 41 to receive fitting 19 or 24. The wall of the bore may be split as at 42 so as to be contracted tightly about the fitting when a collar 43 is screwed tightly thereon.

What I claim and desire to secure by United States Letters Patent is:

1. The method of removing stones from a common bile duct which consists in forming a first incised opening in the duct at a high level and a second incised opening the duodenum opposite to the sphincter of Oddi, inserting a probe through the high level incised opening and extending it through the duct and out of the sphincter of Oddi, attaching a stone dislodging and entrapping instrument to the projecting end of the probe, partially withdrawing the probe to carry the instrument into the duct, manipulating said instrument by manual engagement of opposite ends of the probe-instrument assembly to effect dislodgment and entrapment of the stone, and then withdrawing the probe and instrument from the duct.

2. A common bile duct stone dislodging and extracting instrument comprising, in combination: a shape-retaining flexible probe terminating at one end in a tip and having length substantially greater than that of the length of the common bile duct of an adult person of average size whereby, when inserted tip-end first through an incised opening in said bile duct and thence threaded through the duct into the duodenum and thence outwardly through an incised opening in said duodenum, the opposite ends of said probe will project from said bile duct and duodenum, respectively; an elongate flexible member extending in its in-use position in continuation of said probe from the tip end thereof; complemental, manually operable coupling means on the tip end of the probe and on the adjacent end of said elongate flexible member, respectively, for securing said probe and member to one another for longitudinal movement in response to force applied to the ends thereof opposite their coupled ends; said flexible elongate member comprising a bundle of thin strands of springy material secured together throughout corresponding length portions thereof extending inwardly from their opposite ends and being normally bowed radially outwardly in their corresponding intermediate length portions to form at least a single expansible and contractible stone-trapping cage; the construction and arrangement being such that said elongated flexible member may be drawn longitudinally through said common bile duct in retracting direction exerted on the probe and further that during the course of said movement the cage may be expanded or contracted by force exerted simultaneously on said opposite ends of the probe and flexible elongate member.

3. An instrument according to claim 2, wherein the strands making up the intermediate length portion of said flexible elongate member are secured to one another at corresponding spaced points in manner as to form a plurality of expansible and contractible cages arranged in longitudinal series therealong.

4. An instrument according to claim 3, wherein the end cages are smaller than the other cage or cages of the series thereof.

5. An instrument according to claim 2, wherein the tip end of the probe normally comprises a tip member which is removable to permit coupling of the elongate flexible member to said probe via said coupling means.

6. An instrument for use in the dislodging and removal of obstructions in the common bile duct comprising a bundle of thin flexible strands of springy material arranged coextensive with each other, means securing said strands together throughout corresponding substantially equal length portions extending inwardly from the opposite ends of said strands, thereby to provide force applying end portions, the strands in their corresponding intermediate length portions being normally bowed outwardly radially from the axis of said end portions to form at least a single obstruction receiving and trapping cage, the construction and arrangement being such that said cage may be expanded and contracted during instrument movement through the duct by force applied simultaneously to both said end portions.

7. An instrument according to claim 6, wherein the free ends of said end portions are provided with coupling fittings enabling instrument manipulating components to be attached to said one or both the opposite ends of the instrument.

8. An instrument according to claim 6, wherein the strands making up the bowed intermediate length portion thereof are secured to one another at corresponding spaced points and in manner as to form a plurality of said cages arranged in longitudinal series and which are adapted to be expanded and contracted as aforesaid.

9. An instrument according to claim 8, wherein the end cages are smaller than the other cage or cages of the series thereof.

References Cited in the file of this patent

UNITED STATES PATENTS

| | | |
|---|---|---|
| 892,472 | Walker | July 7, 1908 |
| 894,198 | Funk | July 28, 1908 |
| 1,677,671 | Councill | July 17, 1928 |
| 2,154,968 | Alkio | Apr. 18, 1939 |
| 2,756,752 | Scherlis | July 31, 1956 |
| 2,918,919 | Wallace | Dec. 29, 1959 |
| 2,943,626 | Dormia | July 5, 1960 |
| 3,008,467 | Morris | Nov. 14, 1961 |

FOREIGN PATENTS

| | | |
|---|---|---|
| 195,566 | Austria | Feb. 10, 1958 |